(12) United States Patent
Dietz et al.

(10) Patent No.: US 11,794,130 B2
(45) Date of Patent: Oct. 24, 2023

(54) METHOD FOR PRODUCING A WATER SEPARATOR, AND WATER SEPARATOR

(71) Applicant: MANN+HUMMEL GmbH, Ludwigsburg (DE)

(72) Inventors: Eugen Dietz, Boennigheim (DE); Frank Pflueger, Sachsenheim (DE); Idriss Razgani, Tangier (MA)

(73) Assignee: MANN+HUMMEL GmbH, Ludwigsburg (DE)

( * ) Notice: Subject to any disclaimer, the term of this patent is extended or adjusted under 35 U.S.C. 154(b) by 271 days.

(21) Appl. No.: 17/337,532

(22) Filed: Jun. 3, 2021

(65) Prior Publication Data

US 2021/0291078 A1 Sep. 23, 2021

Related U.S. Application Data

(63) Continuation of application No. PCT/EP2019/081989, filed on Nov. 20, 2019.

(30) Foreign Application Priority Data

Dec. 3, 2018 (DE) ...................... 10 2018 130 648.2

(51) Int. Cl.
*B01D 17/04* (2006.01)
*B01D 17/00* (2006.01)
(Continued)

(52) U.S. Cl.
CPC .......... *B01D 17/045* (2013.01); *B01D 17/10* (2013.01); *B01D 29/05* (2013.01); *B01D 29/111* (2013.01);
(Continued)

(58) Field of Classification Search
CPC .... B01D 17/045; B01D 17/10; B01D 29/111; B01D 29/15; B01D 29/21;
(Continued)

(56) References Cited

U.S. PATENT DOCUMENTS

| 2004/0031748 A1 | 2/2004 | Kochert et al. |
| 2008/0264847 A1 | 10/2008 | Emerson et al. |

(Continued)

FOREIGN PATENT DOCUMENTS

| CN | 101261266 A | 9/2008 |
| CN | 104552919 A | 4/2015 |

(Continued)

*Primary Examiner* — Liam Royce

(57) ABSTRACT

In a method for producing a water separator, a support structure surrounding annularly a longitudinal axis and a hydrophobic screen fabric are provided. By ultrasound or by laser radiation, a material of the support structure is plastified in regions that are radially outward at the support structure in relation to the longitudinal axis to generate plastified regions. The hydrophobic screen fabric is arranged at an outer circumferential side at the support structure and the hydrophobic screen fabric is pressed into the plastified regions. A water separator is provided that has a support structure surrounding annularly a longitudinal axis and a hydrophobic screen fabric of a material that is transparent for a laser radiation. The hydrophobic screen fabric is arranged at an outer circumferential side at the support structure and has sections embedded in radially outwardly positioned regions of the support structure.

8 Claims, 4 Drawing Sheets

(51) Int. Cl.
*B01D 29/11* (2006.01)
*B01D 29/15* (2006.01)
*B01D 29/21* (2006.01)
*F02M 37/24* (2019.01)
*F02M 37/34* (2019.01)
*B01D 29/05* (2006.01)

(52) U.S. Cl.
CPC ...... *B01D 29/21* (2013.01); *B01D 2201/0415* (2013.01); *F02M 37/24* (2019.01); *F02M 37/34* (2019.01)

(58) Field of Classification Search
CPC .......... B01D 2201/0415; B01D 36/003; B01D 65/003; B01D 69/04; B01D 63/06; F02M 37/24; F02M 37/34
See application file for complete search history.

(56) References Cited

U.S. PATENT DOCUMENTS

| | | |
|---|---|---|
| 2014/0326683 A1 | 11/2014 | Kathan et al. |
| 2016/0107108 A1* | 4/2016 | Nordfors ................ B01D 33/23 29/428 |

FOREIGN PATENT DOCUMENTS

| | | |
|---|---|---|
| CN | 107718464 A | 2/2018 |
| DE | 102014003273 A1 | 9/2015 |
| DE | 102015003100 A1 | 9/2016 |
| DE | 102016010778 A1 | 3/2018 |

\* cited by examiner

METHOD FOR PRODUCING A WATER SEPARATOR, AND WATER SEPARATOR

CROSS-REFERENCE TO RELATED APPLICATIONS

This application is a continuation application of international application No. PCT/EP2019/081989 having an international filing date of 20 Nov. 2019 and designating the United States, the international application claiming a priority date of 3 Dec. 2018 based on prior filed German patent application No. 10 2018 130 648.2, the entire contents of the aforesaid international application and the aforesaid German patent application being incorporated herein by reference.

BACKGROUND OF THE INVENTION

The invention concerns a method for producing a water separator and further concerns a water separator.

Water separators are used as final separators in fuel filters, for example. Known water separators comprise an annular hydrophobic screen that is held at the inner side of an injection molded part. For producing such water separators in accordance with the prior art, the screen is placed into a tool and fixed in the tool. Subsequently, the screen is embedded by injection molding in plastic material, i.e., the plastic material is injection molded onto the exterior side of the screen. Due to limitations of the tool technology (requirement of fixation of the screen in the tool and removal of maximally two cores), maximally one transverse rib extending in circumferential direction can be formed for stabilization of the screen. Moreover, a certain number of longitudinal ribs are required, depending on the size of the water separator, for a satisfactory mechanical stability. Due to the transverse rib and the longitudinal ribs which are seated on the exterior side on the screen, an effective (active) separation surface area of the screen is reduced for the conventional flow in radial direction from the exterior to the interior. This reduces the water separation capacity.

DE 100 63 881 A1 discloses a filter element that comprises a support body about which the filter medium is wound. The filter medium is comprised of a fusible material and is seal-tightly fixed by two radial weld seams and a longitudinal weld seam to the support body. The filter medium is compacted in the region of the weld seam upon welding of the filter medium to the support body.

WO 2015/135667 A1 describes a screen filter element for a fuel filter element with a multi-stage water separation device, comprising a tubular screen filter and a support tube that surrounds the screen filter in a direction that is radial in relation to the longitudinal axis of the screen filter element. Radially inwardly pointing connecting stays are formed integrally at the support tube by means of which the support tube is connected to the screen filter with formation of an intermediate space. The screen filter can be welded to the connecting stays or can be embedded in the plastic material of the connecting stays. Radially outwardly, a first and a second coalescing layer of the water separation device can be arranged at the support tube. Radially outwardly of the coalescing layers, a filter bellows can be arranged. In this screen filter element, the active (effective) surface area of the screen filter for water separation is also reduced due to the connecting stays at which the screen filter is held.

SUMMARY OF THE INVENTION

It is therefore the object of the invention to provide a water separator with an active surface area of a water separation medium as large as possible and a method for producing such a water separator.

This object is solved by a manufacturing method for producing a water separator with the steps
providing a support structure surrounding annularly a longitudinal axis,
providing a hydrophobic screen fabric,
plastifying the material of the support structure in regions that are radially outward in relation to the longitudinal axis by ultrasound or by laser radiation,
arranging the screen fabric at the outer circumferential side at the support structure, and
pressing the screen fabric into the plastified regions.

This object is solved furthermore by a water separator with a support structure surrounding annularly a longitudinal axis and with a hydrophobic screen fabric, wherein the screen fabric is arranged at the outer circumferential side at the support structure and is embedded with sections thereof in radially outwardly positioned regions of the support structure and wherein the material of the screen fabric is transparent for laser radiation.

Preferred method variants and embodiments are disclosed in the respective dependent claims and the description.

Manufacturing Methods According to the Invention

According to the invention, a method for producing a water separator is provided. The water separator is preferably a water separator according to the invention as described below. The method according to the invention comprises the steps
providing a support structure that surrounds annularly a longitudinal axis;
providing a hydrophobic screen fabric;
plastifying the material of the support structure in regions that are radially outward in relation to the longitudinal axis by ultrasound or by laser radiation;
arranging the screen fabric at the outer circumferential side at the support structure; and
pressing the screen fabric into the plastified regions.

The water separator is provided for a flow from the exterior to the interior in radial direction. In that the screen fabric is arranged at the outer circumferential side (at the outer circumference) at the support structure, a surface area proportion of the screen fabric as large as possible remains hydrophobically active. Only in those regions in which the screen fabric is pressed into the support structure, the water separating action of the screen fabric is reduced. In addition to the regions in which the screen fabric is embedded, the support structure can comprise also further support regions that support the screen fabric, in particular in radial inward direction, without however connecting these support regions fixedly to the screen fabric, in particular without the screen fabric being pressed into these support regions. The support structure is typically substantially tubular with large surface area penetrations, for example, in the manner of a lattice tube.

The plastification can be realized prior to or after arrangement of the screen fabric at the outer circumference of the support structure. Upon plastification, the material of the support structure can also be partially melted, in particular liquefied. After pressing the screen fabric into the plastified regions, a solidification (cooling/hardening) of the plastified material occurs. A form fit between the screen fabric and the support structure is produced. Due to the plastification of the material of the support structure and pressing in the screen fabric, the screen fabric can be welded to the support structure. In addition to the form fit, a material fusion between the screen fabric and the support structure can be generated. For pressing in the screen fabric, a pressure body, for example, a roller, can be used. The support structure comprises typically at the outer circumferential side a thermoplastic plastic material. Preferably, the entire support structure is comprised of thermoplastic plastic material. The support structure can be embodied as a one-piece injection molded part. In particular, the plastic material can be polyamide. Preferably, the plastic material is fiber-reinforced, for example, with glass fibers. The thermoplastic plastic material is particularly preferred polyamide 6 (PA6), polyethylene terephthalate (PET) or polybutylene terephthalate (PBT), in particular with a glass fiber proportion of maximally 35%.

The material of the support structure can be plastified by ultrasound. By means of ultrasound (ultrasonic waves), a fast and efficient plastification can be realized. Preferably, a rolling sonotrode is used for this purpose. This enables a particularly fast plastification. A vibration direction of the ultrasonic waves can be oriented parallel to or, preferably, orthogonally to the plastified regions.

Alternatively, the material of the support structure can be plastified by laser radiation. When plastifying by means of laser radiation, a particularly uniform and stable connection of screen fabric and support structure can be obtained. The laser radiation can act linearly, areally or point-shaped on the support structure. For producing the laser radiation, a linear, areal or dot laser can be used.

A particularly advantageous further embodiment of the method with plastification by laser radiation is characterized in that the material of the screen fabric is transparent for laser radiation and in that the laser radiation, for plastification of the material of the support structure, passes through or is guided through the screen fabric. In other words, the material of the screen fabric is permeable for the employed (laser) light. The material of the screen fabric thus comprises in relation to the employed laser light a smaller absorption capacity than the material of the support structure to be plastified. Since the screen fabric is transparent for laser radiation, it is not or only minimally heated upon passage of the laser radiation. The screen fabric is in particular not plastified at the laser entry surface but at most at an oppositely positioned joining region (in which the screen fabric is in contact with the support structure). In principle, in this further embodiment of the method, the screen fabric is arranged at least in regions at the outer circumferential side at the support structure prior to plastification.

The support structure can comprise two annular end sections and a first longitudinal rib which extends between the end sections. In an advantageous variant, the method is then designed such that initially, a first longitudinal edge of the screen fabric is connected to the first longitudinal rib, then, two oppositely positioned lateral edges of the screen fabric are connected to the end sections, and finally, a second longitudinal edge of the screen fabric is connected to the first longitudinal rib.

The screen fabric is thus first fixed with its first longitudinal edge at the first longitudinal rib. Subsequently, the screen fabric is connected in circumferential direction to the end sections. Finally, the second longitudinal edge, typically immediately adjacent to the first longitudinal edge, is connected to the first longitudinal rib. In this way, a continuous circumferentially extending connection of screen fabric and support structure can be obtained. In addition, the connection of screen fabric and support structure can be done in a continuous process. In particular, the screen fabric can be wound onto the support structure for connecting to the end sections. This facilitates the fold-free attachment of the screen fabric. The end sections are arranged spaced apart from each other in longitudinal direction (along the longitudinal axis). The longitudinal rib extends typically parallel to the longitudinal axis. Connecting the longitudinal and lateral edges of the screen fabric to the end sections or the longitudinal rib of the support structure is realized by plastifying these regions of the support structure and pressing the screen fabric into the plastified regions. Pressing in the screen fabric into the end sections can be done by a pretension of the screen fabric, in particular wherein the screen fabric is wound under tension onto the support structure.

For a particularly preferred further embodiment of the aforementioned method variant, the screen fabric is provided as an endless fabric. After connecting the first longitudinal edge of the screen fabric to the first longitudinal rib of the support structure, a section which forms the screen fabric of the water separator is separated from the endless fabric with formation of the second longitudinal edge of the screen fabric. In other words, the first longitudinal edge of the section of the endless fabric forming the screen fabric of the water separator is connected to the first longitudinal rib while this section of the endless fabric is still connected to the remaining part of the endless fabric. Typically, the screen fabric is fastened almost completely (approximately across at least 300°, in particular across at least 330°) in circumferential direction to the end sections of the support structure prior to the section forming the screen fabric of the water separator being separated from the endless fabric. Particularly preferred, the screen fabric is fastened in circumferential direction completely to the end sections prior to the section forming the screen fabric of the water separator being separated from the endless fabric. A complete fastening in circumferential direction is to be assumed when the connecting lines of the screen fabric extend at the end sections from the first longitudinal rib once about the (outer) circumference of the respective end section to meet to the first longitudinal rib again, respectively. An endless fabric is to be understood as a fabric whose length is significantly larger than the length that is required for covering the outer circumference of a support structure. Preferably, the endless fabric is dimensioned such that at least 100, particularly preferred at least 1,000, water separators can be produced with separation of the respective screen fabric from the endless fabric. The use of an endless fabric enables a particular rational manufacture of a plurality of water separators. It is understood that, for the repeated performance of this method variant, the number of water separators that can still be produced by use of the endless fabric continuously decreases and finally the aforementioned numbers of water separators that can be produced with the remaining rest of the endless fabric are undershot. The endless fabric can be provided on a reel. By exerting a torque on the reel, a tension of the screen fabric which is required for pressing in the screen fabric can be controlled and established with simple means.

The invention concerns also a method for producing a plurality of water separators by repeated performance of an afore described method with a screen fabric that is provided as an endless fabric by use of the same endless fabric. This method enables an economic manufacture of a plurality of water separators. The sections forming the screen fabric of the water separator to be produced, respectively, are separated sequentially from the endless fabric. Upon separation of the section forming the screen fabric of the water separator to be presently produced from the endless fabric with the formation of the second longitudinal edge of this section, the first longitudinal edge of the section of the endless fabric forming the screen fabric of the water separator to be produced next is typically formed also. This avoids the production of waste of the endless fabric.

Water Separator According to the Invention

The present invention also encompasses a water separator with a support structure surrounding annularly a longitudinal axis and with a hydrophobic screen fabric. The screen fabric is arranged at the outer circumferential side at the support structure. The screen fabric is embedded with sections thereof in radially outwardly positioned regions of the support structure. Thus, the entire surface of the screen fabric with the exception of the embedded regions is available for separating water. The screen fabric also surrounds the longitudinal axis annularly. The radially outwardly positioned regions in which the screen fabric is embedded are located at the outer circumferential side at the support structure. The water separator has been preferably produced by a method according to the invention. The water separator is embodied for flow from the exterior to the interior in radial direction. The water separator can be part of a filter. Typically, the water separator is embodied for use in a fuel filter. The water separator can be provided also for use in an oil filter. The water separator can be used in this context as a final separator, i.e., as last stage of a multi-stage water separation device. The water separator can be arranged radially within a filter medium of the filter that annularly surrounds the longitudinal axis. Between the filter medium and the water separator, one or a plurality of layers of coalescing material can be arranged.

The material of the screen fabric is transparent for laser radiation. This enables plastification of the material of the support structure by means of laser radiation in regions that are external in radial direction in relation to the longitudinal axis, after the screen fabric has been arranged in these regions at the support structure. In particular, due to the transparency of the screen fabric, softening of the material of the screen fabric can be limited to the joining area (facing the support structure).

Advantageously, the support structure comprises a first longitudinal rib. The first longitudinal rib extends typically parallel to the longitudinal axis. A first and a second longitudinal edge of the screen fabric are embedded in the first longitudinal rib. In other words, the longitudinal edges are arranged in overlap with the first longitudinal rib. Due to the first longitudinal rib, the support structure can be reinforced. Moreover, the first longitudinal rib makes it possible to fasten the screen fabric at the support structure so as to be closed in circumferential direction.

Particularly preferred, the support structure comprises at least one, preferably at least two, further longitudinal ribs. The further longitudinal ribs enable an additional reinforcement of the support structure and a support action of the screen fabric. The screen fabric is preferably not embedded in the further longitudinal ribs. In this way, a particularly large hydrophobic surface area of the screen fabric remains active for water separation. Typically, the screen fabric is contacting the further longitudinal ribs. The screen fabric is then supported by the further longitudinal ribs in radial direction. The further longitudinal ribs and the first longitudinal rib are arranged spaced apart from each other principally in circumferential direction.

The support structure can comprise two annular end sections. Two oppositely positioned lateral edges of the screen fabric can be embedded in the end sections. Due to the end sections, a shape of the water separator, for example, a circular shape, can be defined and the support structure can be reinforced. Typically, the end sections are circular at the outer circumferential side, respectively. Due to the connection of the screen fabric to the annular end sections, a likewise annular arrangement of the screen fabric about the longitudinal axis can be established.

The support structure can comprise at least one, preferably at least two, transverse rib(s) which is/are arranged between the end sections and extend(s) in circumferential direction. The transverse ribs reinforce the support structure additionally. Moreover, the screen fabric can be supported in radial direction by the transverse ribs. The screen fabric can contact the transverse ribs for this purpose. The screen fabric is preferably not embedded in the transverse rib(s). In this way, a surface area of the screen fabric as large as possible remains active for water separation.

The support structure comprises at the outer circumferential side advantageously a thermoplastic plastic material. The thermoplastic plastic material can be particularly easily plastified. Preferably, the entire support structure is comprised of the thermoplastic plastic material. The support structure according to the invention can be embodied in particular as a one-piece injection molded part. The thermoplastic plastic material is particularly preferred PA6, PET, or PBT, in particular with a glass fiber proportion of maximally 35%.

The screen fabric can comprise hydrophobically coated monofilaments. The screen fabric comprises preferably (mono) filaments of PET (polyethylene terephthalate) or PA (polyamide). The screen fabric can comprise filaments that are woven with each other. The filaments of the screen fabric can also be arranged so as extend above or below each other, without crossing each other alternatingly above and below. The filaments are principally connected to each other by material fusion at their crossing points.

BRIEF DESCRIPTION OF THE DRAWINGS

Further features and advantages of the invention result from the following detailed description of embodiments of the invention, from the claims as well as with the aid of the Figures of the drawing which illustrate details according to the invention. The aforementioned and still to be explained features can be realized individually by themselves, respectively, or a plurality thereof in any combinations in variants of the invention. The features illustrated in the drawing are illustrated such that the particularities according to the invention can be made clearly visible.

DESCRIPTION OF PREFERRED EMBODIMENTS

Figure 1:
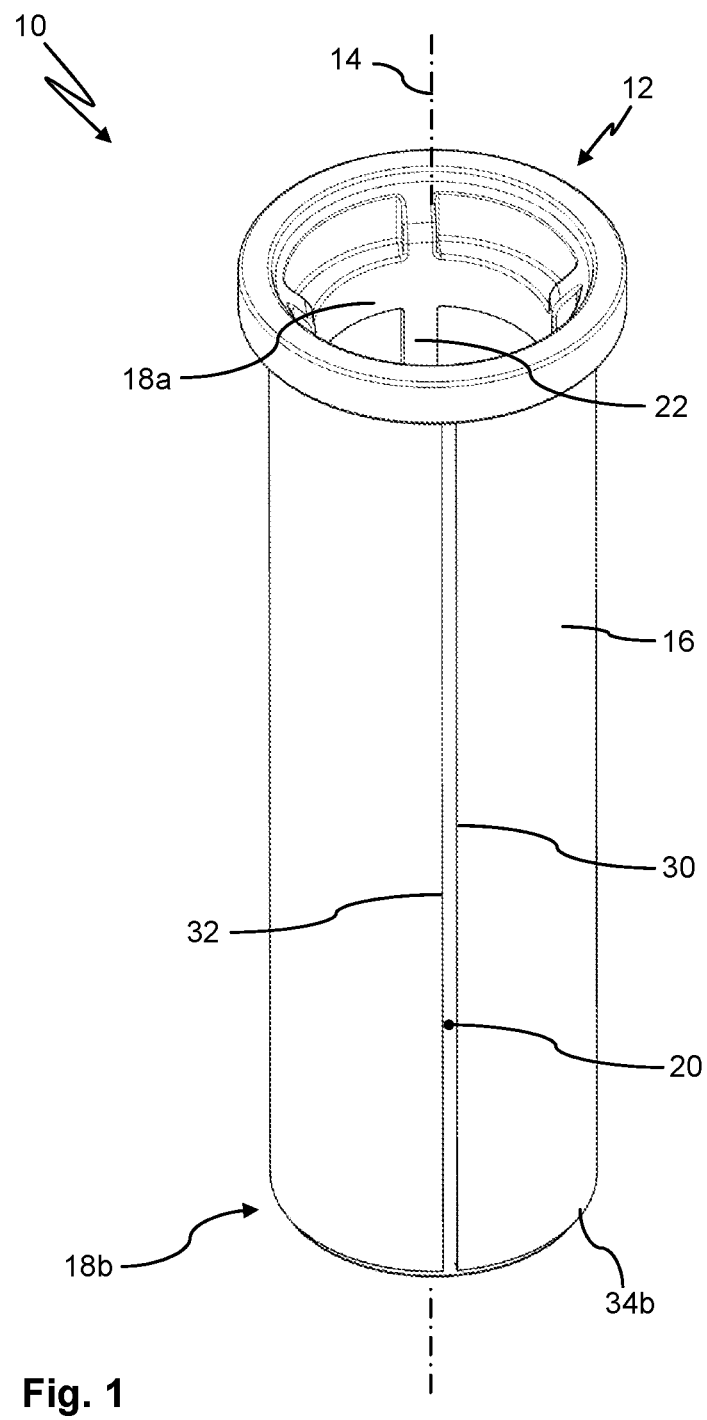
FIG. 1 shows a water separator with a hydrophobic screen fabric arranged at an outer circumferential side at a support structure in a schematic perspective illustration.

FIG. 1 shows a water separator 10 in a perspective view. The water separator 10 comprises a support structure 12.

The support structure 12 surrounds annularly a longitudinal axis 14. The water separator 10 comprises moreover a hydrophobic screen fabric 16. The screen fabric 16 comprises hydrophobically coated monofilaments (not illustrated in detail). The screen fabric 16 is arranged at the outer circumferential side at the support structure 12. The screen fabric 16 also surrounds annularly the longitudinal axis 14.

Figure 2:
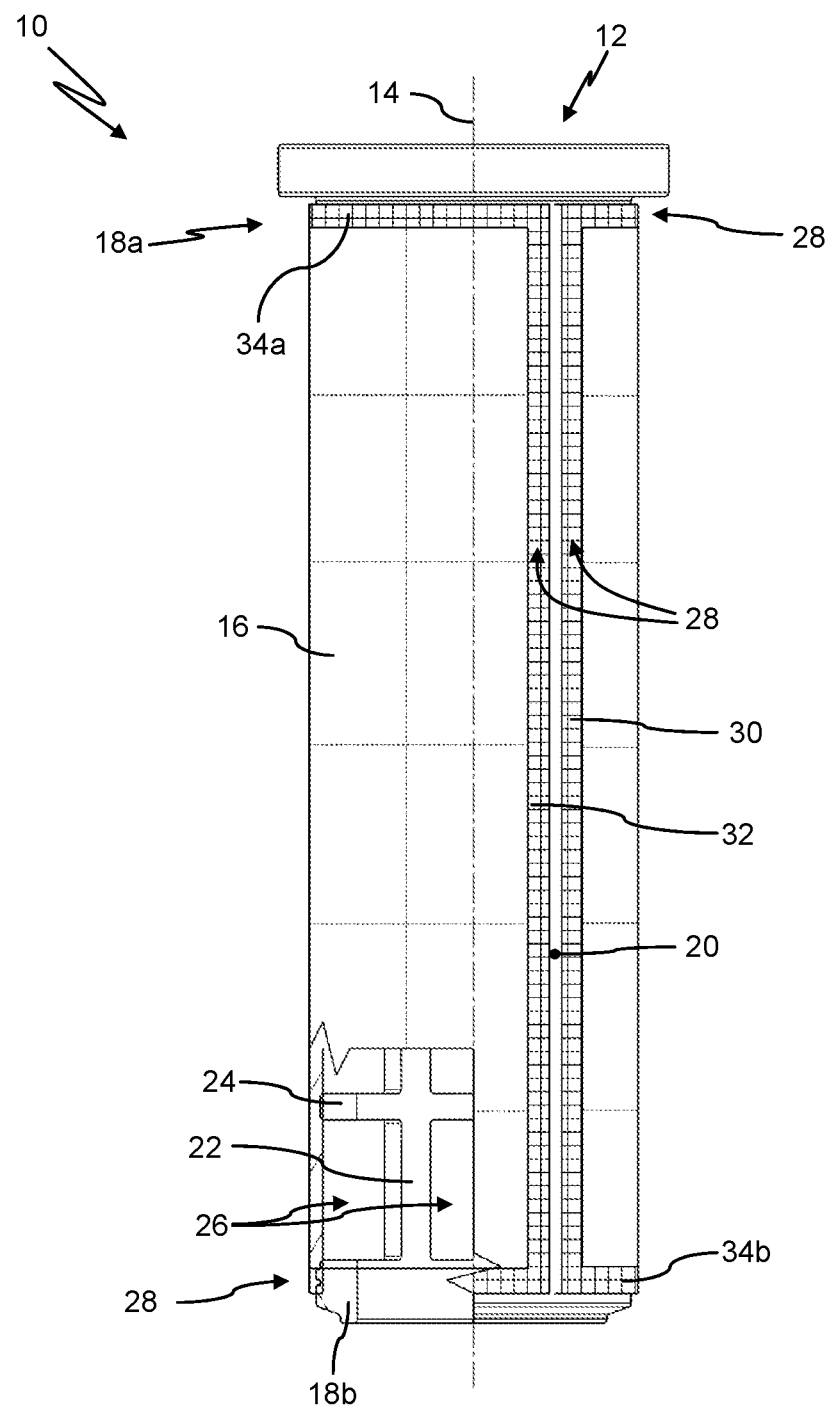
FIG. 2 shows the water separator of FIG. 1 in a partially sectioned schematic side view.

FIG. 2 shows the water separator 10 of FIG. 1 in a partially sectioned side view. The support structure 12 comprises two end sections 18a, 18b which are spaced apart from each other along the longitudinal axis 14. The end sections 18a, 18b are annular, here circular, and surround the longitudinal axis 14. The longitudinal ribs 20, 22 extend between the end sections 18a, 18b. The longitudinal ribs 20, 22 extend here parallel to the longitudinal axis 14. The support structure 12 comprises moreover transverse ribs 24 circumferentially extending in circumferential direction about the longitudinal axis 14. The transverse ribs 24 connect the longitudinal ribs 20, 22 with each other. Flow openings 26 are formed in the support structure 12 between the longitudinal ribs 20, 22 and the transverse ribs 24. The support structure 12 is embodied thus like a lattice tube. The flow openings 26 occupy a major portion of the circumferential surface area of the support structure 12. A surface area proportion of the flow openings 26 (when viewed in radial direction) is larger than a surface area proportion of the longitudinal and transverse ribs 20, 22, 24.

The screen fabric 16 is arranged radially outwardly at the support structure 12 and contacts it. The screen fabric 16 is embedded with sections thereof in regions 28 of the support structure 12 that are radially outwardly positioned in relation to the longitudinal axis 14. The regions 28 in which the screen fabric 16 is embedded in the support structure 12 are located radially outwardly at the two end sections 18a, 18b and externally at the first longitudinal rib 20. A first longitudinal edge 30 and a second longitudinal edge 32 of the screen fabric 16 are embedded in the first longitudinal rib 20. Two oppositely positioned side edges 34a, 34b of the screen fabric 16 are embedded in the end sections 18a and 18b, respectively. The regions 28 of embedding are indicated in FIG. 2 by a checked pattern. The regions of embedding of the screen fabric 16 in the material of the support structure 12 form here a closed circumferentially extending contour. In the region of the additional longitudinal ribs 22 and of the transverse ribs 24, the screen fabric 16 is not embedded in the support structure 12. The screen fabric 16 instead is resting radially outwardly loosely at the further longitudinal ribs 22 and the transverse ribs 24. The screen fabric 16 is supported in this way.

In order to embed the screen fabric 16 into the end disks 18a, 18b and the first longitudinal rib 20, the material of the support structure 12 was plastified in the regions 28. For this purpose, laser radiation (laser light) emitted by a laser (not illustrated) was used. In order to be able to plastify the material of the support structure 12 with the screen fabric 16 arranged at the outer circumferential side by means of laser radiation, the screen fabric 16 is transparent for laser radiation. The laser radiation penetrates thus the screen fabric 16 without (appreciably) heating it. Only the regions 28 of the support structure 12 positioned radially inwardly behind the screen fabric 16 are heated by the laser radiation and thereby transferred into a plastic state. The support structure 12 comprises at the outer circumferential side a thermoplastic plastic material, e.g. polyamide. Such a thermoplastic plastic material can be transferred by heating into a plastified state. Here, the entire support structure 12 is comprised of the thermoplastic plastic material. The support structure 12 is embodied here as a one-piece injection molded part.

After plastification, the screen fabric 16 was pressed into the plastified regions 28 of the support structure 12. Subsequently, the plastified regions 28 were solidified by cooling. In this way, a fixed connection of support structure 12 and screen fabric 16 was obtained.

Figure 3:
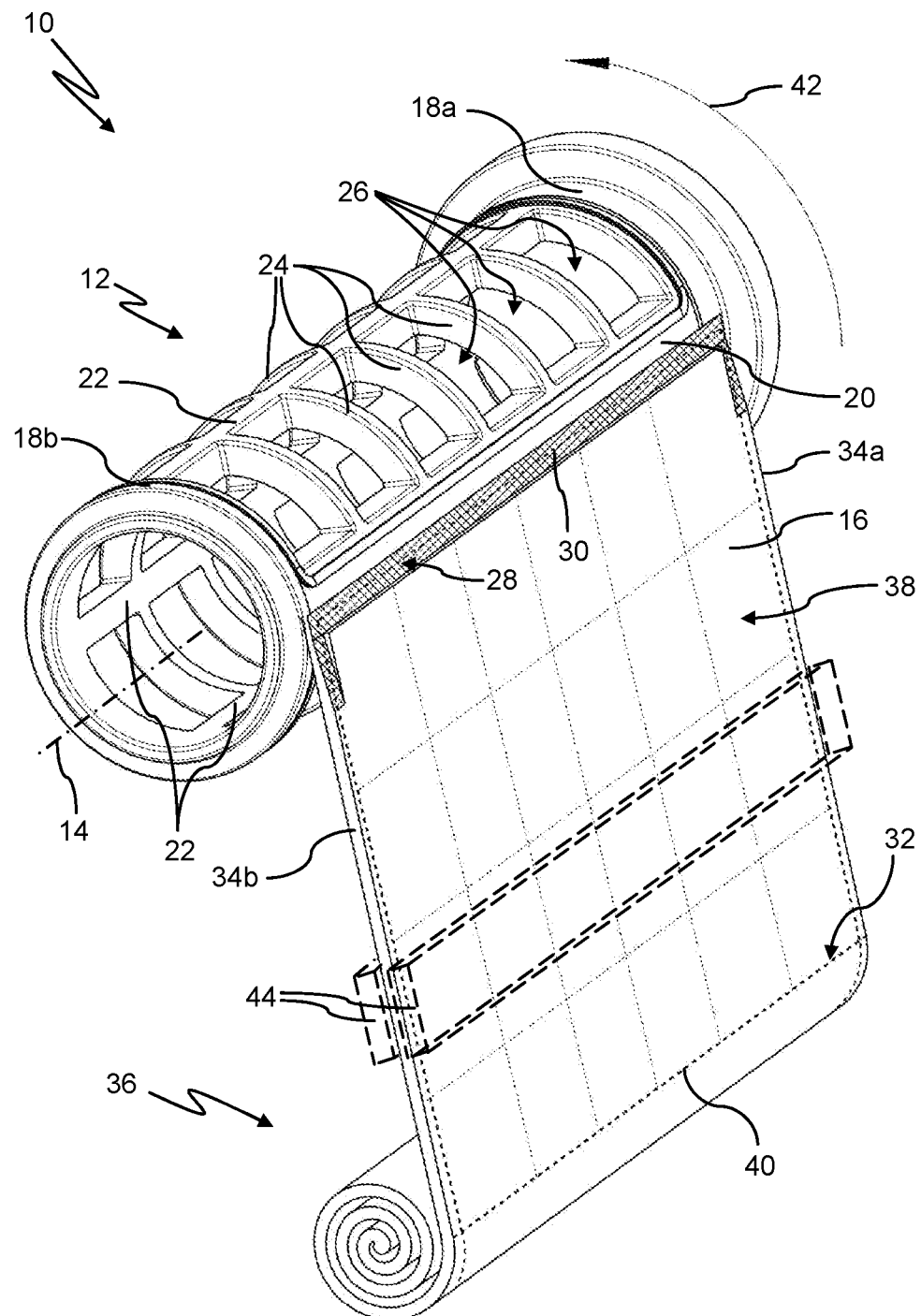
FIG. 3 shows the water separator according to FIGS. 1 and 2 in an intermediate stage during its manufacture in a schematic perspective view.

FIG. 3 shows the water separator 10 according to FIGS. 1 and 2 during its manufacture. In the illustrated state of the manufacturing process, the first longitudinal edge 30 of the screen fabric 16 is connected to the first longitudinal rib 20 of the support structure 12. The screen fabric 16 is provided here as an endless fabric 36. During the further course of the manufacture, a section 38 of the endless fabric 36 forming the screen fabric 16 of the water separator 10 to be concretely produced is separated along the line 40 from the residual endless fabric 36 (roll goods) with formation of the second longitudinal edge 32.

First, during the further course of the manufacturing process, the screen fabric 16 is however embedded with its lateral edges 34a, 34b in the end sections 18a, 18b. For this purpose, the support structure 12 is rotated in arrow direction 42 about the longitudinal axis 14. The screen fabric 16 is wound in this way onto the support structure 12. The regions of the end sections 18a, 18b in which the screen fabric 16 has just been wound thereon are heated by laser radiation and thereby plastified. The laser radiation penetrates in this context the screen fabric 16 which is transparent for laser radiation of the employed wavelength. The screen fabric 16 is held with tension during winding onto the support structure 12, for example, in that the screen fabric 12 is guided through a braking device 44. Due to this tension, the lateral edges 34a, 34b of the screen fabric 16 are pressed into the plastified regions of the end sections 18a, 18b. After a subsequent cooling of the plastified regions, a fixed connection is obtained.

Subsequently, the second longitudinal edge 32 of the screen fabric 16 is connected to the first longitudinal rib 20. For this purpose, the first longitudinal rib 20 is plastified by means of laser radiation. Subsequently, the second longitudinal edge 32 is pressed by means of a pressure body, for example, a roller (not illustrated), into the first longitudinal rib 20. After cooling of the plastified region of the first longitudinal rib 20, a fixed connection is obtained. In a corresponding manner, the first longitudinal edge 30 was initially connected to the first longitudinal rib 20.

The remaining part of the endless fabric 36 can be used for manufacturing further water separators.

Figure 4:
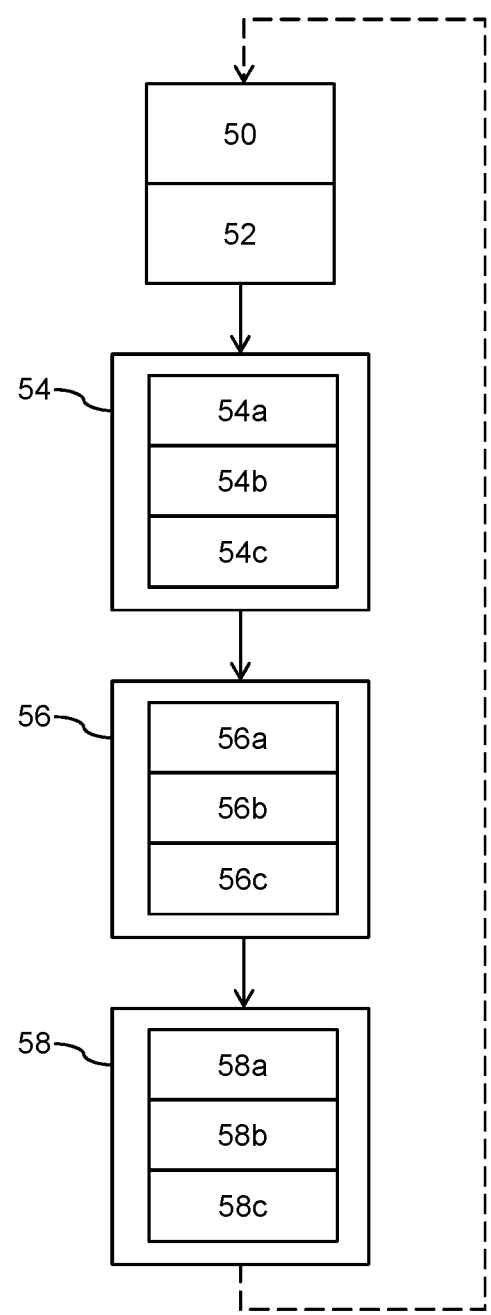
FIG. 4 shows a schematic flowchart of a method for producing a plurality of water separators.

FIG. 4 shows a schematic flowchart of a method for producing many water separators 10 according to FIGS. 1, 2. In the sequence of the method, a state according to FIG. 3 is reached, respectively.

First, in steps 50 and 52, a support structure 12 and a hydrophobic screen fabric 16 in the form of an endless fabric 36 are provided. Then, in a step 54, a first longitudinal edge 30 of the screen fabric 16 is connected to a first longitudinal rib 20. For this purpose, in a partial step 54a the first longitudinal edge 30 is arranged radially outwardly at the first longitudinal rib 20. In a partial step 54b, the material of the support structure 12 is plastified radially outwardly at the first longitudinal rib 20. In a final partial step 54c, the first longitudinal edge 30 is pressed into the plastified region 28 of the first longitudinal rib 20.

In a subsequent step 56, the oppositely positioned lateral edges 34a, 34b of the screen fabric 16 are connected to end sections 18a and 18b, respectively, of the support structure 12. For this purpose, in a partial step 56a, the lateral edges 34a, 34b are arranged radially outwardly at the respectively arranged end sections 18a, 18b. In a partial step 56b, the material of the end sections 18a, 18b is plastified at the outer circumferential side. Then, in a partial step 56c, the lateral edges 34a, 34b are pressed into the plastified material of the end sections 18a, 18b.

In a final step 58, a second longitudinal edge 32 of the screen fabric 16 is connected to the first longitudinal rib 20. For this purpose, in a partial step 58a, the second longitudinal edge 32 is arranged radially outwardly at the first longitudinal rib 20. In a partial step 58b, the material of the support structure 12 is plastified radially outwardly at the first longitudinal rib 20. In a subsequent partial step 58c, the second longitudinal edge 32 is pressed into the plastified region 28 of the first longitudinal rib 20. In this context, the second longitudinal edge 32 is connected to the first longitudinal rib 20 immediately adjacent to the first longitudinal edge 30.

Subsequently, further water separators 10 can be produced in the same manner. Their screen fabric 16 can be provided as a new section 38 of the same endless fabric 36, respectively.

The plastification can be realized as described above by means of laser radiation, respectively. As an alternative, ultrasound can be used for plastification. The ultrasonic waves can be produced and transmitted onto the support structure 12 by means of a rolling sonotrode. With the rolling sonotrode, the screen fabric can also be pressed into the plastified regions 28 of the support structure 12.

The partial steps 54a, 56a, 58a can be realized before or after or simultaneously with the partial steps 54b, 56b, 58b, respectively. Typically, first the partial steps 54a, 56a, 58a are performed, respectively. The partial steps 54c, 56c, 58c can be substantially performed simultaneously with the partial steps 54b, 56b, 58b or subsequent thereto.

What is claimed is:

1. A method for producing a water separator, the method comprising:
   providing a support structure surrounding annularly a longitudinal axis;
   providing a hydrophobic screen fabric;
   plastifying by ultrasound or by laser radiation a material of the support structure in regions that are radially outward at the support structure in relation to the longitudinal axis to generate plastified regions;
   arranging the hydrophobic screen fabric at an outer circumferential side at the support structure;
   pressing the hydrophobic screen fabric into the plastified regions.

2. The method according to claim 1, further comprising employing a rolling sonotrode in the step of plastifying.

3. The method according to claim 1, further comprising selecting a material of the hydrophobic screen fabric to be transparent for a laser radiation and
passing the laser radiation through the hydrophobic screen fabric in the step of plastifying.

4. The method according to claim 1, further comprising employing a pressure body for pressing the hydrophobic screen fabric into the plastified regions.

5. The method according to claim 4, wherein
the pressure body is a roller.

6. The method according to claim 1, further comprising:
   providing the support structure with two annular end sections and a first longitudinal rib extending between the end sections;
   connecting initially a first longitudinal edge of the hydrophobic screen fabric to the first longitudinal rib;
   subsequently connecting two oppositely positioned lateral edges of the hydrophobic screen fabric to the two annular end sections;
   subsequently, connecting a second longitudinal edge of the hydrophobic screen fabric to the first longitudinal rib.

7. The method according to claim 6, further comprising:
   a) selecting the hydrophobic screen fabric to be an endless fabric;
   b) connecting an end of the endless fabric as the first longitudinal edge of the hydrophobic screen fabric to the first longitudinal rib of the support structure;
   c) separating a section from the endless fabric to form the hydrophobic screen fabric of the water separator and to form a second longitudinal edge of the hydrophobic screen fabric.

8. The method according to claim 7, further comprising
providing a plurality of the support structures and
repeating the steps b) and c) for each one of the plurality of support structures for producing a plurality of the water separators.

* * * * *